(12) United States Patent
Kamimura et al.

(10) Patent No.: US 10,715,747 B2
(45) Date of Patent: Jul. 14, 2020

(54) SENSOR SUPPORT SYSTEM, TERMINAL, SENSOR, AND METHOD FOR SUPPORTING SENSOR

(71) Applicant: OMRON Corporation, Kyoto-shi, Kyoto (JP)

(72) Inventors: Atsushi Kamimura, Kusatsu (JP); Kenji Sato, Kusatsu (JP); Hirohito Mizumoto, Otsu (JP); Ziqiang Xu, Kusatsu (JP); Hajime Ujiie, Takatsuki (JP)

(73) Assignee: OMRON Corporation, Kyoto-shi (JP)

( * ) Notice: Subject to any disclaimer, the term of this patent is extended or adjusted under 35 U.S.C. 154(b) by 178 days.

(21) Appl. No.: 15/784,369

(22) Filed: Oct. 16, 2017

(65) Prior Publication Data
US 2018/0205892 A1  Jul. 19, 2018

(30) Foreign Application Priority Data
Jan. 16, 2017 (JP) .................. 2017-005029

(51) Int. Cl.
| | |
|---|---|
| *H04N 5/272* | (2006.01) |
| *G06Q 10/08* | (2012.01) |
| *G06T 7/73* | (2017.01) |
| *H04N 5/232* | (2006.01) |
| *G06T 7/70* | (2017.01) |
| *G06K 7/10* | (2006.01) |

(Continued)

(52) U.S. Cl.
CPC ......... *H04N 5/272* (2013.01); *G06K 7/10722* (2013.01); *G06K 7/1417* (2013.01); *G06K 19/06037* (2013.01); *G06Q 10/08* (2013.01); *G06T 7/70* (2017.01); *G06T 7/73* (2017.01); *H04N 5/232* (2013.01); *H04N 5/23293* (2013.01)

(58) Field of Classification Search
CPC .... H04N 5/272; H04N 5/232; H04N 5/23293; H04N 7/18; G06T 7/73; G06T 7/70; G06K 19/06037; G06K 7/10722; G06K 7/1417; G06Q 10/08
See application file for complete search history.

(56) References Cited

U.S. PATENT DOCUMENTS 9,832,412 B2 * 11/2017 Burkholz ............ G06F 19/3468
2009/0014520 A1 * 1/2009 Kofman ................ G06K 7/143
235/439

(Continued)

FOREIGN PATENT DOCUMENTS

JP   2015-158999 A   9/2015

*Primary Examiner* — Twyler L Haskins
*Assistant Examiner* — Fayez Bhuiyan
(74) *Attorney, Agent, or Firm* — Metrolex IP Law Group, PLLC

(57) ABSTRACT

A sensor support system includes a sensor and a terminal device configured to display form information of the sensor. The sensor includes a two-dimensional code (storage tag) which can be read from the terminal device and which is configured to store the form information of the sensor. The terminal device is configured to calculate position information of the sensor from an image of the sensor, configured to generate a virtual image of the form information of the sensor, and configured to display on a display an image in which the virtual image is superimposed on an image of the sensor taken by a camera.

11 Claims, 7 Drawing Sheets

(51) Int. Cl.
*G06K 7/14* (2006.01)
*G06K 19/06* (2006.01)

(56) References Cited

U.S. PATENT DOCUMENTS

2017/0032666 A1* 2/2017 Pretorius ............ G06K 7/10425
2018/0061154 A1* 3/2018 Scalisi .................. H04N 7/186

* cited by examiner

SENSOR SUPPORT SYSTEM, TERMINAL, SENSOR, AND METHOD FOR SUPPORTING SENSOR

CROSS-REFERENCE TO RELATED APPLICATION

This application is based on Japanese Patent Application No. 2017-005029 filed with the Japan Patent Office on Jan. 16, 2017, the entire contents of which are incorporated herein by reference.

FIELD

The disclosure relates to a sensor support system, a terminal, a sensor, and a method for supporting a sensor which support installation, setting, and the like of a sensor by displaying form information of the sensor on the terminal.

BACKGROUND

In order to detect objects, various types of sensors are installed in machines and equipment used in many production sites. The various types of sensors include a photoelectric sensor and the like disclosed in JP2015-158999 A, for example. JP2015-158999 A exemplifies a reflection type photoelectric sensor and discloses a photoelectric sensor in which detection light emitted from a light projection element is reflected by an object and the return light is received by a light receiving element.

When the photoelectric sensor disclosed in JP2015-158999 A is installed in a machine or equipment, it is necessary to install the photoelectric sensor to be adjusted at a position at which the detection light emitted from the light projection element radiates an object. However, the detection light emitted from the light projection element is invisible for naked eyes; therefore, it is impossible to install the photoelectric sensor in a machine or equipment while checking the detection light. Further, in order to determine whether the photoelectric sensor is installed in a detection area in which an object can be detected, it is necessary to perform positioning by repeatedly detecting an object being actually moved.

SUMMARY

One or more aspects may provide a sensor support system, a terminal, a sensor, and a method for supporting a sensor in which form information of the sensor is displayed on the terminal so that operation of installation and setting of the sensor can be efficiently performed.

A sensor support system according to an aspect includes: a sensor; and a terminal configured to display form information of the sensor. The sensor includes a storage tag which is readable from the terminal and which is configured to store the form information of the sensor. The terminal includes: an imaging unit configured to take an image of the sensor; a reading unit configured to read information from the storage tag of the sensor; a position calculator configured to calculate position information of the sensor from the image of the sensor taken by the imaging unit, an image generator configured to generate a virtual image of the form information, based on the position information calculated by the position calculator; a synthesizing unit configured to superimpose the virtual image on the image of the sensor taken by the imaging unit to synthesize a synthetic image; and a display configured to display the synthetic image synthesized by the synthesizing unit.

It may be preferable that the form information of the sensor includes at least a detection direction and a detection area of the sensor.

It may be preferable that the form information includes further shape information of the storage tag, and the position calculator calculates the position information of the sensor by comparing the shape information of the storage tag read by the reading unit with the image of the storage tag taken by the imaging unit.

It may be preferable that the reading unit reads out relevant information related to the read information of the storage tag, from a storage of the terminal or an external storage.

It may be preferable that the storage tag is a two-dimensional code.

According to another aspect, a terminal is configured to display form information of a sensor. The sensor includes a storage tag which is readable from the terminal and which is configured to store the form information of the sensor. The terminal includes: an imaging unit configured to take an image of the sensor; a reading unit configured to read information from the storage tag of the sensor; a position calculator configured to calculate position information of the sensor from the image of the sensor taken by the imaging unit; an image generator configured to generate a virtual image of the form information, based on the position information calculated by the position calculator; a synthesizing unit configured to superimpose the virtual image on the image of the sensor taken by the imaging unit to synthesize a synthetic image; and a display configured to display the synthetic image synthesized by the synthesizing unit.

According to another aspect, a sensor causes a terminal to display form information. The terminal includes: an imaging unit configured to take an image of the sensor; a reading unit configured to read information from the storage tag of the sensor; a position calculator configured to calculate position information of the sensor from the image of the sensor taken by the imaging unit; an image generator configured to generate a virtual image of the form information, based on the position information calculated by the position calculator; a synthesizing unit configured to superimpose the virtual image on the image of the sensor taken by the imaging unit to synthesize a synthetic image; and a display configured to display the synthetic image synthesized by the synthesizing unit. The sensor includes a storage tag which is readable from the terminal and which is configured to store the form information of the sensor.

According to another aspect, form information of the sensor is displayed on a terminal in a method for supporting a sensor. The method for supporting a sensor includes: taking an image of the sensor including a storage tag which is readable from the terminal and which is configured to store the form information of the sensor; reading information from the storage tag of the sensor; calculating position information of the sensor from the taken image of the sensor; generating a virtual image of the form information, based on the calculated position information; superimposing the virtual image on the taken image of the sensor to synthesize a synthetic image; and displaying the synthetic image.

With a sensor support system according to the present technology, a virtual image of form information of a sensor is displayed, on a display of a terminal, to be superimposed on an image of the sensor; therefore, the form information of the sensor is made visible so that installation and setting of the sensor can be efficiently performed.

DETAILED DESCRIPTION

Figure 1:
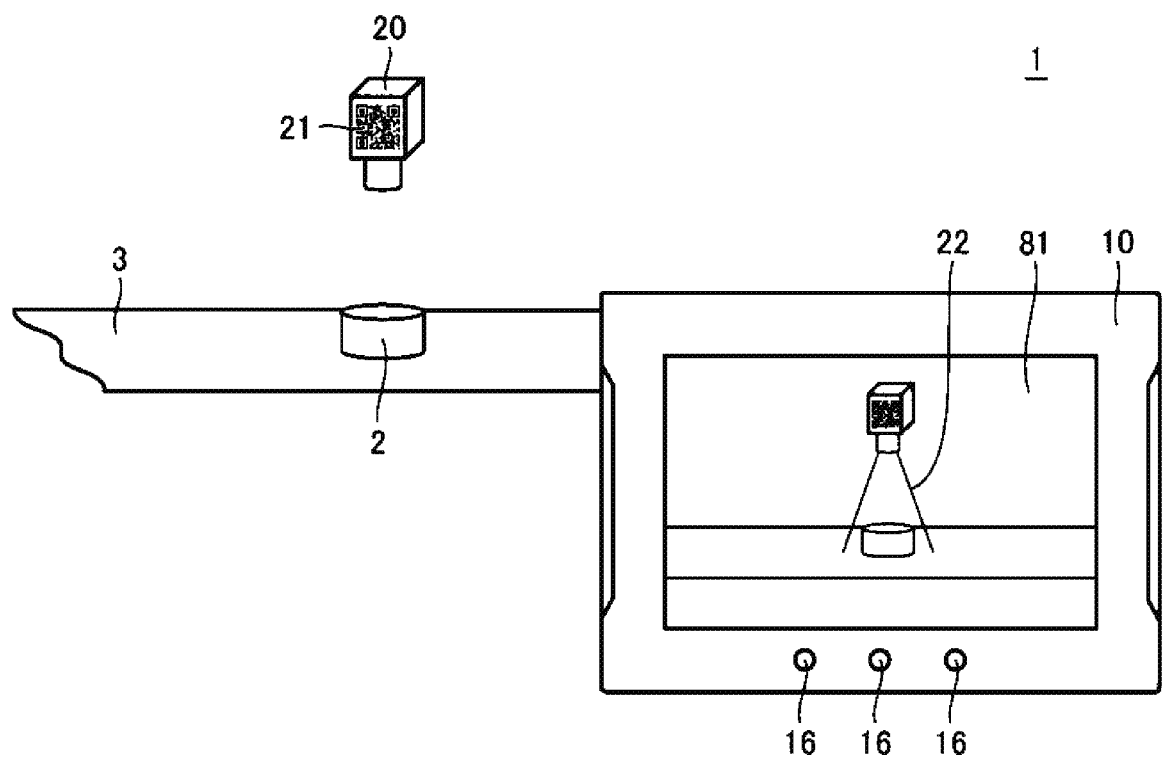
FIG. 1 is a schematic diagram illustrating a schematic configuration of a sensor support system in an embodiment.

Hereinafter, embodiments will be described in detail with reference to the drawings. Note that in the drawings, the same reference sign represents the same or equivalent part.

A. Configuration of Sensor Support System

A sensor support system according to an embodiment has a function for supporting an operation of installation and setting of a sensor to be installed in a machine or equipment at, for example, a production site, and the sensor support system can make visible form information of the sensor such as a detection direction and a detection area. First, with reference to FIG. 1, a configuration of the sensor support system according to an embodiment will be described.

FIG. 1 is a schematic diagram showing a schematic configuration of a sensor support system in an embodiment. A sensor support system 1 includes a terminal device 10 and a sensor 20. As described later, the terminal device 10 may be added with a configuration communicable with an external device so that information about the sensor 20 can be collected. As the external device, a PC, a data base, a programmable logic controller (PLC) for controlling the sensor 20 can be considered. In the following description, a configuration will be described as an example. In the configuration, when the terminal device 10 is added with a configuration communicable with an external device, the terminal device 10 communicates with a PLC for controlling the sensor 20.

Figure 3:
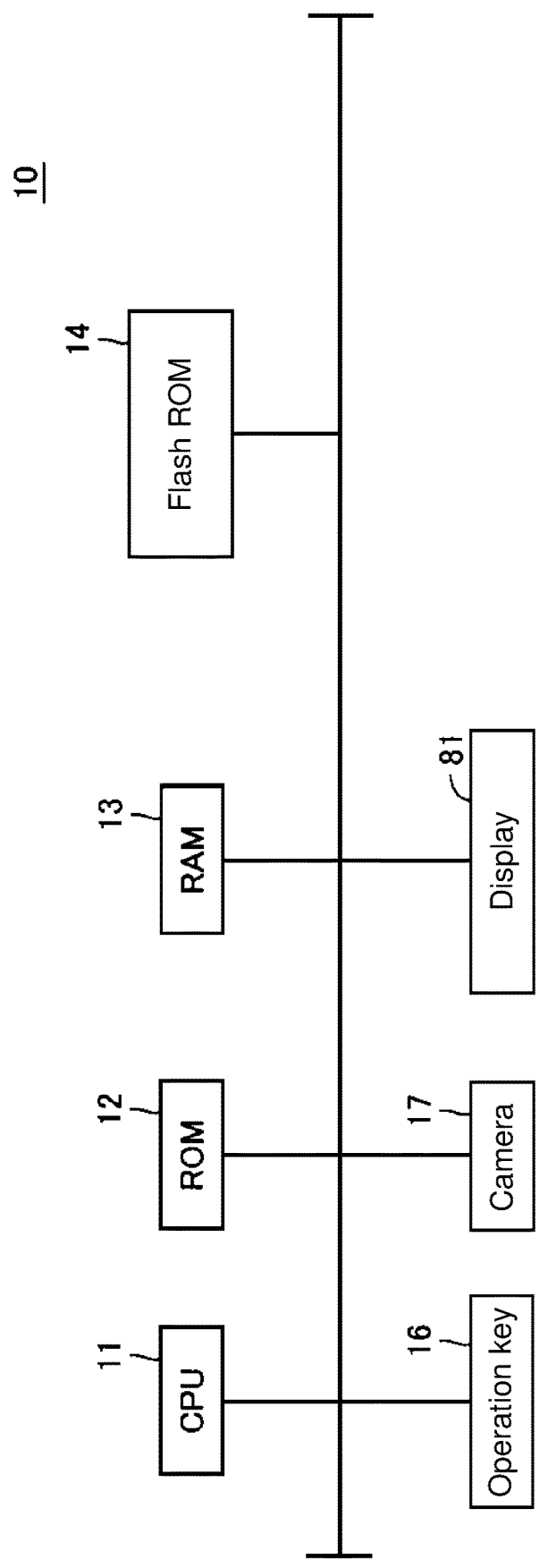
FIG. 3 is a schematic diagram illustrating a hardware configuration of a terminal device in an embodiment.

The terminal device 10 includes an operation key 16, a display 81 as a display unit, and a camera as an imaging unit (see FIG. 3). Note that in an example of the terminal device 10 shown in FIG. 1, the camera is provided not on a case surface on the side of the display 81 but on the case surface on the opposite side of the display 81; however, the configuration is not limited to this example. For example, the camera may be connected through a cable or the like instead of being provided directly on the case of the terminal device 10. When the camera takes an image of the sensor 20, the terminal device 10 reads the form information of the sensor 20 from a two-dimensional code 21 (storage tag) attached on the sensor 20. The form information of the sensor 20 includes information about installation and setting of the sensor 20 such as a detection direction and a detection area of the sensor 20. Therefore, the terminal device 10 can read the form information of the sensor 20 from the two-dimensional code 21 and can display a virtual image 22 showing the detection area of the sensor 20 in such a manner that, for example, the virtual image is superimposed on the image of the sensor 20 taken by the camera. Note that the sensor 20 is an optical sensor for measuring, for example, a height or concavity and convexity of the surface of a product (object 2) flowing on a production line 3, and in order to detect correctly, the detection direction and the detection area of the sensor need to be disposed at the right position with respect to the object 2.

In order to superimpose the virtual image 22 on the taken image of the sensor 20, it is necessary to calculate the position information of the sensor and to adjust the position and size of the virtual image 22. Regarding the position information of the sensor, the position and the distance of the sensor 20 are calculated on the terminal device 10 by comparing shape information of the two-dimensional code 21 itself included in the two-dimensional code 21 with the taken image of the two-dimensional code 21. Specifically, the terminal device 10 calculates the position (posture and inclination) of the sensor 20 from distortion of the imaged two-dimensional code 21, and calculates the distance (depth) from the camera to the sensor 20 from the size of the imaged two-dimensional code 21. The terminal device 10 specifies the position of the sensor 20 in the taken image on the basis of the position information of the sensor, adjusts the position and size of the virtual image 22 in accordance with the image of the sensor 20, and generates a synthetic image in which the taken image of the sensor 20 and virtual image 22 are combined. Note that the shape information of the two-dimensional code 21 itself does not have to be included in the two-dimensional code 21, and it is possible to refer to the shape information stored in another storage (for example, a storage of the terminal device 10 or other storages).

By seeing the synthetic image of the terminal device 10 shown in FIG. 1, an operator can see the detection area of the sensor 20 and can easily check whether the object 2 is in the detection area of the sensor 20 or not. Therefore, the installation and setting of the sensor 20 can be efficiently performed with the sensor support system 1 according to an embodiment.

The terminal device 10 can read out relevant information stored in a storage such as the storage of the terminal device 10 or an external device (for example, a PLC) other than the form information of the sensor 20 included in the two-dimensional code 21. The relevant information includes, for example, a manual of the sensor 20 and information about how to countermeasure troubles. The terminal device 10 displays the read-out relevant information such that the read-out relevant information is superimposed on the image of the sensor 20; thus, it is also possible to simultaneously view the relevant information required to install and set the sensor 20, thereby improving the operation efficiency of the operator. Note that the configuration may be made such that the link information is included in the two-dimensional code 21 and the form information of the sensor 20 (for example, the detection direction and the detection area of the sensor 20) itself is stored in the storage of the terminal device 10 or the storage of an external device.

B. Configuration of Sensor

Figure 2:
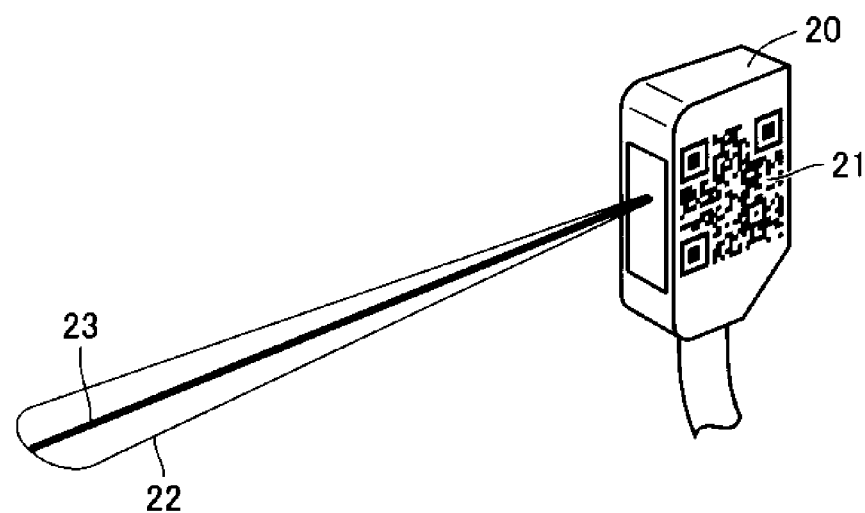
FIG. 2 is a schematic diagram illustrating a schematic configuration of a sensor in an embodiment.

Next, the sensor 20 will be specifically described. FIG. 2 is a schematic diagram showing a schematic configuration of the sensor 20 in an embodiment. The sensor 20 is, for example, a photoelectric sensor and uses projected light to detect the presence or absence of an object or change of a surface of an object. The photoelectric sensor is configured with a light projecting unit for emitting light and a light receiving unit for receiving light, and the photoelectric sensor detects change, in the intensity of the light reaching the light receiving unit, caused by the projected light being interrupted or reflected by an object. To detect an object correctly by a photoelectric sensor, the object needs to be in the detection direction and to be included in the detection area. The detection direction of the photoelectric sensor is the direction in which the optical axis projected from the light projecting unit extends, and the detection area is the optical axis itself. Further, the photoelectric sensor has an error in the detection area around the optical axis. However, it is not easy to check whether the optical axis of the photoelectric sensor extends in the direction of the object and to check how large the error in the detection area is. To address this issue, by obtaining the form information of the sensor 20 from the two-dimensional code 21, the terminal device 10 displays a virtual image 23 showing the optical axis of the sensor 20 and the virtual image 22 showing the error in the detection area in such a manner that the virtual image 23 and the virtual image 22 are superimposed on the image of the sensor 20 as shown in FIG. 2, so that the optical axis and the detection area of the sensor 20 can be visualized.

C. Hardware Configuration of Terminal Device

Next, a hardware configuration of the terminal device 10 will be specifically described. FIG. 3 is a schematic diagram showing the hardware configuration of the terminal device 10 in an embodiment. The terminal device 10 shown in FIG. 3 is equipped with a central processing unit (CPU) 11 for performing various calculations, a read only memory (ROM) 12, a random access memory (RAM) 13, a flash ROM 14 for storing various programs in a non-volatile manner, the operation key 16, a camera 17, and the display 81. These parts are mutually connected to one another through an internal bus. Further, a communication interface needs to be equipped for the terminal device 10 to be communicably connected to an external device.

The display 81 may be configured only with a display or may be configured to have a touch panel disposed to cover the display 81. If a communication interface is provided, an Ethernet (registered trade mark) InterFace (IF), a serial IF, and a universal serial bus (USB) IF can be provided, for example.

The CPU 11 expands the program stored in the flash ROM 14 on the RAM 13 or the like to execute the program. The ROM 12 generally stores programs such as an operating system (OS). The RAM 13 is a volatile memory and is used as a working memory.

D. Functional Configuration of Terminal Device

Figure 4:
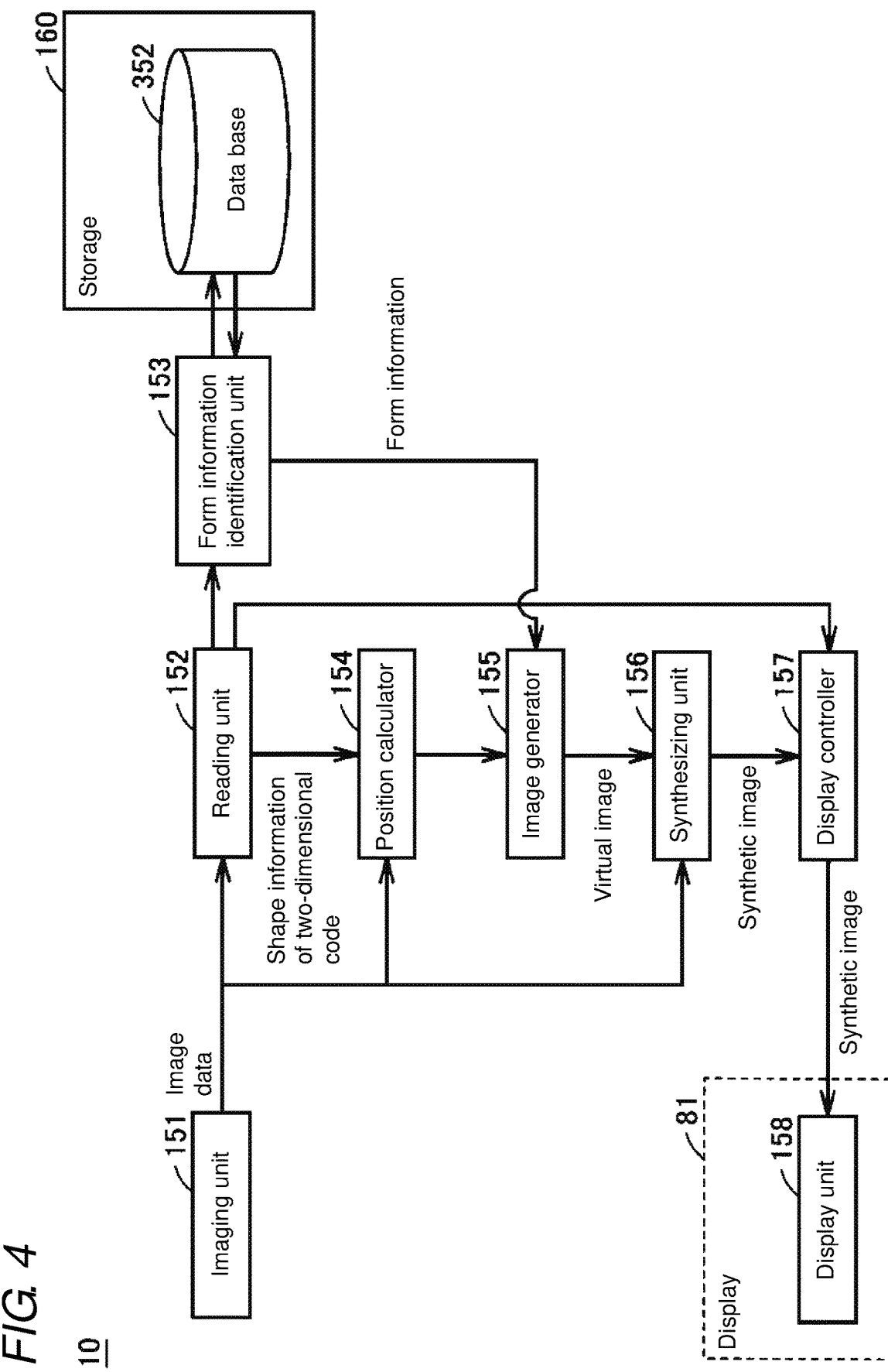
FIG. 4 is a schematic diagram illustrating a functional configuration of a terminal device in an embodiment.

Next, a functional configuration of the terminal device 10 will be specifically described. FIG. 4 is schematic diagram showing the functional configuration of the terminal device in an embodiment. The terminal device 10 shown in FIG. 4 is equipped with an imaging unit 151, a reading unit 152, a form information identification unit 153, a position calculator 154, an image generator 155, a synthesizing unit 156, a display controller 157, a display unit 158, and a storage 160.

Note that the imaging unit 151 corresponds to the camera 17 shown in FIG. 3 and the like. The display unit 158 corresponds to the display 81. The storage 160 corresponds to the flash ROM 14 and the ROM 12.

The storage 160 has a data base 352. The data base 352 stores the form information of the sensor 20 and the relevant information.

If a setting menu for the sensor 20 is chosen by the operation key 16 (see FIG. 3) or the like, the imaging unit 151 activates the camera 17 to perform an imaging process. The imaging unit 151 takes an image of the sensor 20 and sends the image data obtained by the imaging to the reading unit 152. The image data includes the two-dimensional code 21 attached on the sensor 20. The imaging unit 151 may take a still image or may take a moving image. In the following, for the sake of convenience, it is supposed that the image data is taken as a still image.

The reading unit 152 reads information from the two-dimensional code 21 included in the image data. If the image data does not include the two-dimensional code 21, the reading unit 152 sends an instruction to the display controller 157 to display on the display unit 158 a message saying that the sensor 20 needs to be imaged again such that the two-dimensional code 21 is included. The information read from the two-dimensional code 21 includes the form information of the sensor 20 and the shape information of the two-dimensional code 21. If the form information of the sensor 20 is included in the two-dimensional code 21 itself, the form information identification unit 153 identifies the form information of the sensor 20 based on the information sent from the reading unit 152. On the other hand, if the form information of the sensor 20 is not included in the two-dimensional code 21 itself, the form information identification unit 153 reads out the form information of the sensor 20 from the data base 352 based on the information sent from the reading unit 152 and identifies the form information of the sensor 20. The reading unit 152 sends the shape information of the two-dimensional code 21 to the position calculator 154.

The position calculator 154 compares the shape information of the two-dimensional code 21 with the image of the two-dimensional code 21 taken by the imaging unit 151 to calculate the position information of the sensor 20. The position information of the sensor 20 includes the information of the position and the distance of the sensor 20 in the image taken by the imaging unit 151. The position calculator 154 sends the calculated position information of the sensor 20 to the image generator 155.

The image generator 155 generates a virtual image (for example, the virtual image 23 representing the optical axis and the virtual image 22 representing the error in the detection area [see FIG. 2]) in accordance with the form information of the sensor 20 sent from the form information identification unit 153. Further, the image generator 155 adjusts the position and size of the virtual image so that the generated virtual image can be superimposed on the image of the sensor 20. Specifically, the image generator 155 identifies a light projection port from the taken image of the sensor 20 and turns the virtual image 23 so that the direction of the virtual image 23 representing the optical axis coincides with the direction of the light emitted from the light projection port. The image generator 155 sends the adjusted virtual image to the synthesizing unit 156. Note that in the image generator 155, the process of calculating the position of the virtual image from the position information of the sensor 20 and other processes can be performed in the same way as processes in the augmented reality technology.

The synthesizing unit 156 combines the image of the sensor 20 taken by the imaging unit 151 and the virtual image sent from the image generator 155 to synthesize a synthetic image. Note that if the virtual image sent from the image generator 155 cannot be successfully superimposed on the image of the sensor 20 taken by the imaging unit 151, the synthesizing unit 156 may feed back error information to the image generator 155 so as to make the image generator 155 adjust the virtual image again. The synthesizing unit 156 sends the synthesized synthetic image to the display controller 157.

The display controller 157 makes the display unit 158 (that is, the display 81) display the synthetic image sent from the synthesizing unit 156. Further, the display controller 157 can make the display unit 158 display various information (for example, a numerical value and a character string) transmitted from an external device.

E. Hardware Configuration of PLC

Figure 5:
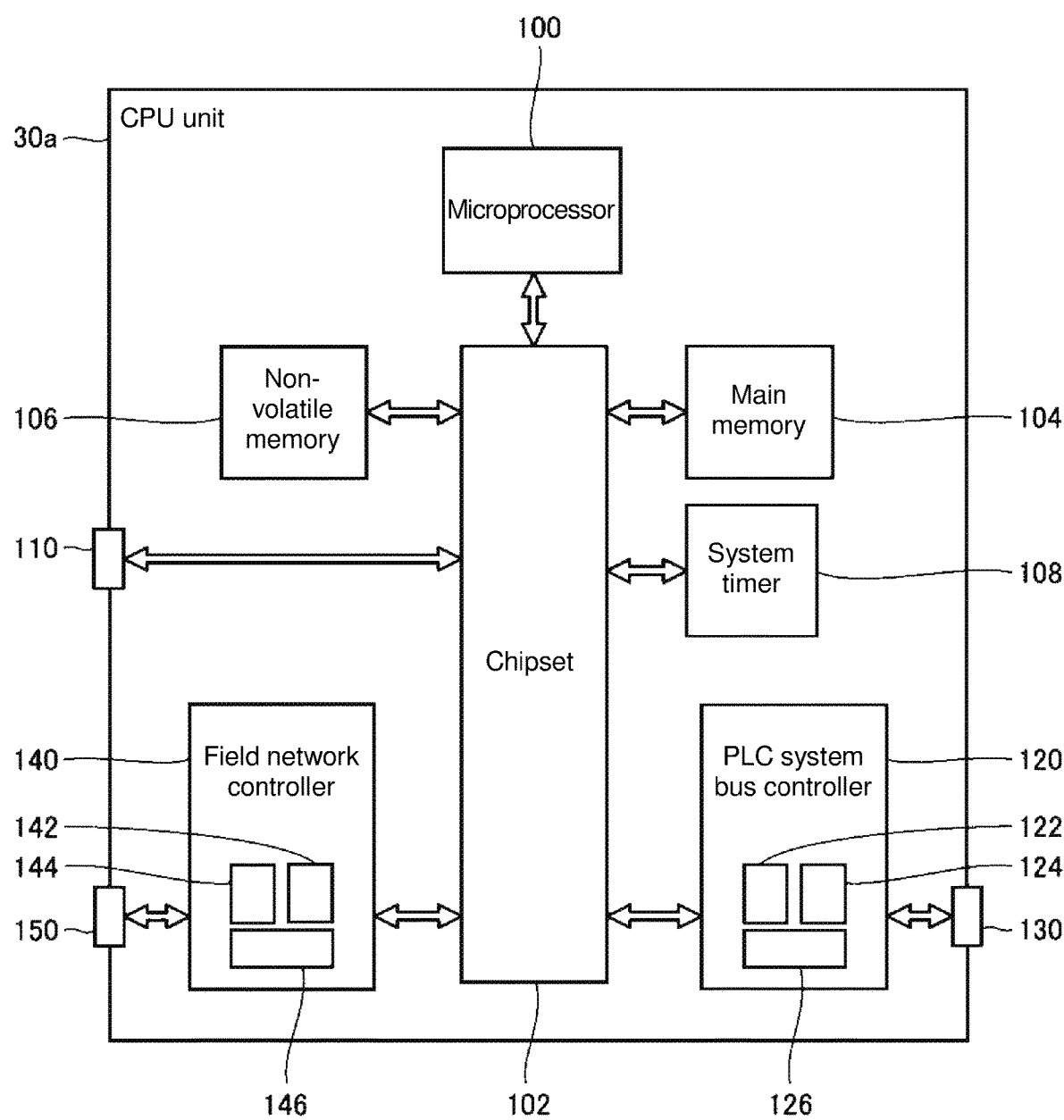
FIG. 5 is a schematic diagram illustrating a hardware configuration of a CPU unit in an embodiment.

Supposing that the terminal device 10 is provided with a communication interface connected to a PLC as an external device so as to collect information about the sensor 20, the configuration of the PLC as a connection destination will be described. Specifically, a hardware configuration of a CPU unit of the PLC will be described. FIG. 5 is a schematic diagram showing the hardware configuration of the CPU unit in an embodiment. A CPU unit 30a shown in FIG. 5 is a component included in the PLC and includes a microprocessor 100, a chipset 102, a main memory 104, a non-volatile memory 106, a system timer 108, a PLC system bus controller 120, a field network controller 140, and a USB connector 110. The chipset 102 is connected to each of other components through various buses.

The microprocessor 100 and the chipset 102 are typically configured in accordance with a general-purpose computer architecture. That is, the microprocessor 100 decodes and executes instruction codes serially supplied from the chipset 102 according to an internal clock. The chipset 102 communicates internal data with the various components connected to the chipset 102 and generates instruction codes necessary to the microprocessor 100. Further, the chipset 102 has a function to cache the data or the like obtained as a result of the execution of arithmetic processing on the microprocessor 100.

The CPU unit 30a has the main memory 104 and the non-volatile memory 106 as storages.

The main memory 104 is a volatile storage area (RAM) and holds various types of programs to be executed on the microprocessor 100 after the CPU unit 30a is powered on. Further, the main memory 104 is used also as a working memory when the microprocessor 100 executes various programs. As the main memory 104 described above, a device such as a dynamic random access memory (DRAM) or a static random access memory (SRAM) is used.

On the other hand, the non-volatile memory 106 stores, in a non-volatile manner, data such as a real-time operating system (OS), a system program for the PLC, a user program, a motion calculation program, and a system setting parameter, and the form information of the sensor 20. These programs and data are copied, if necessary, in the main memory 104 for the microprocessor 100 to access. As the non-volatile memory 106 described above, a semiconductor memory such as a flash memory can be used. Alternatively, a magnetic recording medium such as a hard disk drive or an optical recording medium such as a digital versatile disk random access memory (DVD-RAM) can be used.

The system timer 108 generates an interrupt signal and provides the interrupt signal to the microprocessor 100 at a fixed cycle. Typically, interrupt signals are each generated at each of a plurality of different cycles in accordance with specifications of hardware; however, setting can be made such that an interrupt signal is generated at an arbitrary cycle by an operating system (OS), a basic input output system (BIOS), or the like. This interrupt signal generated by the system timer 108 is used to realize various control operations.

The CPU unit 30a has the PLC system bus controller 120 and the field network controller 140 as a communication circuit.

A buffer memory 126 functions as a transmission buffer for data to be output to another unit (hereinafter also referred to as "output data") through a PLC system bus 130 and a reception buffer for data input from another unit (hereinafter also referred to as "input data") through the PLC system bus 130. Note that the output data generated by arithmetic processing on the microprocessor 100 is primitively stored in the main memory 104. Then, the output data to be transferred to a specific unit is read out from the main memory 104 and temporarily stored in the buffer memory 126. Further, the input data transferred from another unit is temporarily held in the buffer memory 126 and is then moved to the main memory 104.

A DMA control circuit 122 performs transfer of output data from the main memory 104 to the buffer memory 126 and transfer of input data from the buffer memory 126 to the main memory 104.

A PLC system bus control circuit 124 performs processing of transmission of the output data in the buffer memory 126 to another unit connected to the PLC system bus 130, reception of the input data from another unit connected to the PLC system bus 130, and storing of the input data in the buffer memory 126. Typically, the PLC system bus control circuit 124 provides functions of a physical layer and a data link layer in the PLC system bus 130.

The field network controller 140 controls transmission and reception of data through a field network 150. That is, the field network controller 140 controls transmission of output data and reception of input data in conformity with the standard of an employed field network 150. As described above, the field network 150 in conformity with the EtherCAT (registered trade mark) standard is used in an embodiment; therefore, the field network controller 140 including hardware for performing normal Ethernet (registered trade mark) communication is used. According to the EtherCAT (registered trade mark) standard, it is possible to use a general Ethernet (registered trade mark) controller which realizes a communication protocol in conformity with the normal Ethernet (registered trade mark) standard. However, if some types of industrial Ethernet (registered trade mark) are used as the field network 150, an Ethernet (registered trade mark) controller of special specification is used, which controller is compatible with the communication protocol of a dedicated specification different from a normal communication protocol. Alternatively, if a field network 150 other than the industrial Ethernet (registered trade mark) is used, the dedicated field network controller in conformity with the standard is used. The PLC communicates with the communication interface of the terminal device 10 through the field network controller 140.

A DMA control circuit 142 transfers output data from the main memory 104 to a buffer memory 146 and input data from the buffer memory 146 to the main memory 104.

A field network control circuit 144 performs transmission processing of the output data in the buffer memory 146 to another device connected to the field network 150, reception processing of the input data from another device connected to the field network 150, and storage processing of the received data in the buffer memory 146. Typically, the field network control circuit 144 provides functions of a physical layer and a data link layer in the field network 150.

The USB connector 110 is an interface for connecting an external device such as a PLC support device and the CPU unit 30a to each other. Typically, a program executable on the microprocessor 100 of the CPU unit 30a and the like transferred from an external device are taken into the PLC through the USB connector 110.

F. Support Process of Terminal Device

Figure 6:
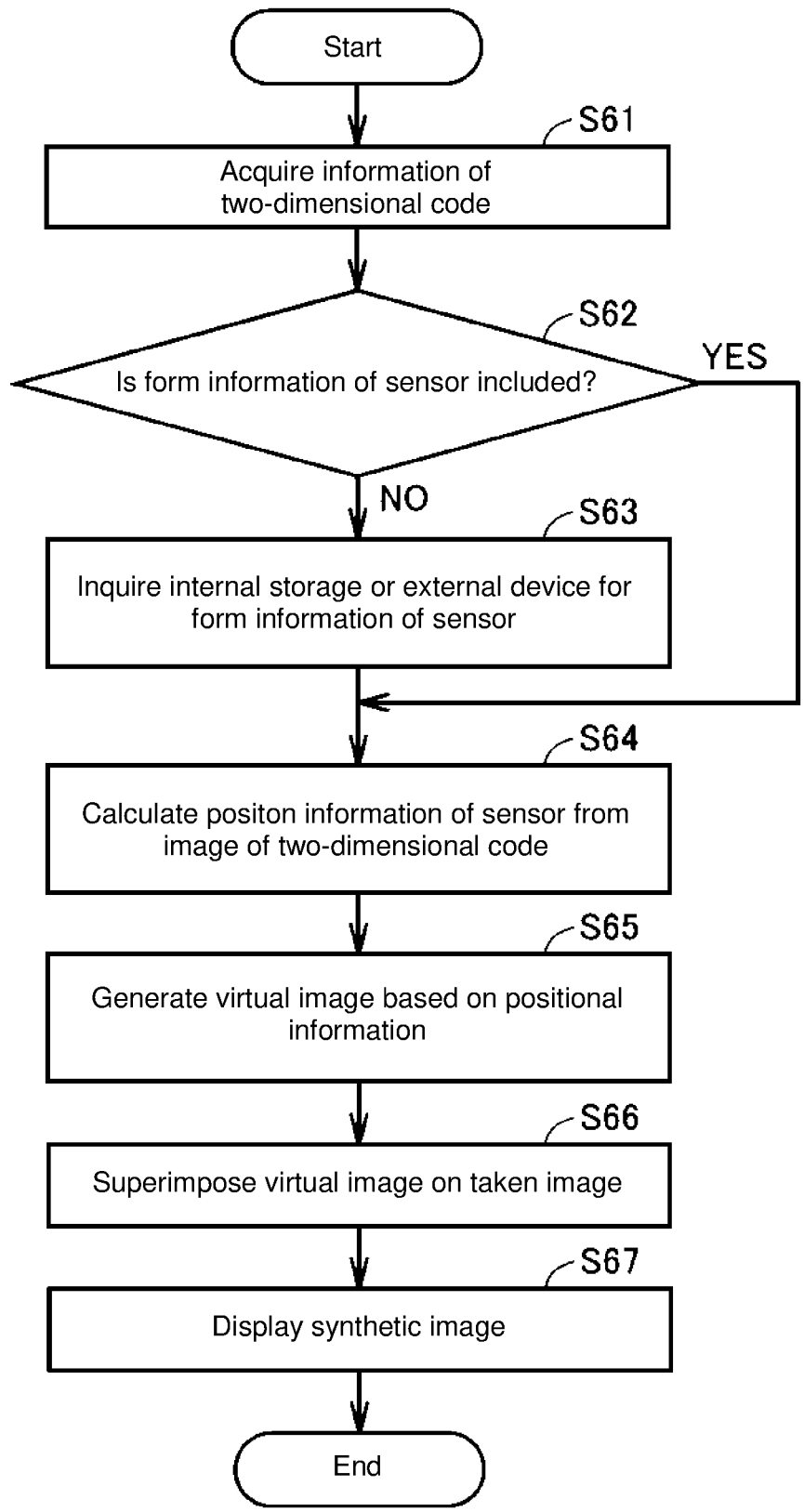
FIG. 6 is a flowchart illustrating a display process on a terminal device in an embodiment.

A support process of the installation and setting of the sensor performed on the terminal device 10 will be described in more detail. The support process is performed on the CPU 11 of the terminal device 10. FIG. 6 is a flowchart for describing a display process on the terminal device in an embodiment. In the flowchart shown in FIG. 6, the CPU 11 acquirers the information of the two-dimensional code 21 attached on the sensor 20 from the image of the sensor 20 taken by the camera 17 (step S61).

Next, the CPU 11 determines whether the acquired information of the two-dimensional code 21 includes the form information of the sensor 20 (step S62). If the acquired information of the two-dimensional code 21 does not include the form information of the sensor 20 (step S62: NO), the CPU 11 inquires a storage in the terminal device 10 (for example, the PLC and the like) or an external device for the form information of the sensor 20 (step S63). As a result of the inquiry, the CPU 11 acquires the form information of the sensor 20 from the storage in the terminal device 10 or the external device. If the acquired information of the two-dimensional code 21 includes the form information of the sensor 20 (step S62: YES), the CPU 11 does not inquire the storage in the terminal device 10 or the external device for the form information of the sensor 20.

Next, the CPU 11 compares the shape information of the two-dimensional code 21 included in the information of the two-dimensional code 21 with the image of the two-dimensional code 21 taken by the camera 17 to calculate the position information of the sensor 20 (step S64).

Next, based on the position information of the sensor 20 calculated in step S64, the CPU 11 generates a virtual image of the form information of the sensor 20 (for example, the detection direction, the detection area of the sensor 20, and the like) (step S65).

Next, the CPU 11 superimposes the virtual image generated in step S65 on the image of the sensor 20 (picked-up image) taken by the camera 17 (step S66).

Next, the CPU 11 displays the image (synthetic image) synthesized in step S66 on the display 81 (step S67).

As described above, in the sensor support system 1 according to an embodiment, the position information of the sensor 20 is calculated from the image of the sensor 20 to generate the virtual image 22 of the form information of the sensor 20, and the display 81 displays the image in which the virtual image 22 is superimposed on the image of the sensor taken by the camera 17. Therefore, in the sensor support system 1, the terminal device 10 can visualize the form information of the sensor 20, whereby the operation of the installation and setting of the sensor 20 can be efficiently performed.

Further, the form information of the sensor 20 includes at least the detection direction and the detection area of the sensor 20. Therefore, the terminal device 10 can visualize and display the detection direction and the detection area of the sensor 20, whereby the operation of the installation and setting of the sensor 20 can be efficiently performed.

In addition, the form information of the sensor 20 further includes the shape information of the two-dimensional code (storage tag), and the position calculator 154 compares the shape information of the two-dimensional code (storage tag) read by the reading unit 152 with the image of the two-dimensional code (storage tag) taken by the imaging unit 151 to calculate the position information of the sensor 20. Therefore, in the terminal device 10, there is no need for an operator to specify the position (posture and inclination) of the sensor 20 or the distance (depth) to the sensor 20, and the operator has only to take an image of the sensor 20 with the camera 17 to generate an image on which the virtual image of the form information of the sensor 20 is superimposed.

Further, the reading unit 152 reads out the relevant information (for example, the manual of the sensor 20 and the like) related to the read information of the two-dimensional code (storage tag) from the storage of the terminal device 10 or a storage of an external device. Therefore, the terminal device 10 can generate an image on which the relevant information of the sensor 20 is superimposed, whereby the operation of the installation and setting of the sensor 20 can be efficiently performed.

G. Types of Sensors

With reference to FIG. 2, the photoelectric sensor is described as a specific example of the sensor 20. However, the sensor 20 is not limited to the photoelectric sensor and may be other types of sensors. In the following, typical types of sensors will be described.

Figure 7:
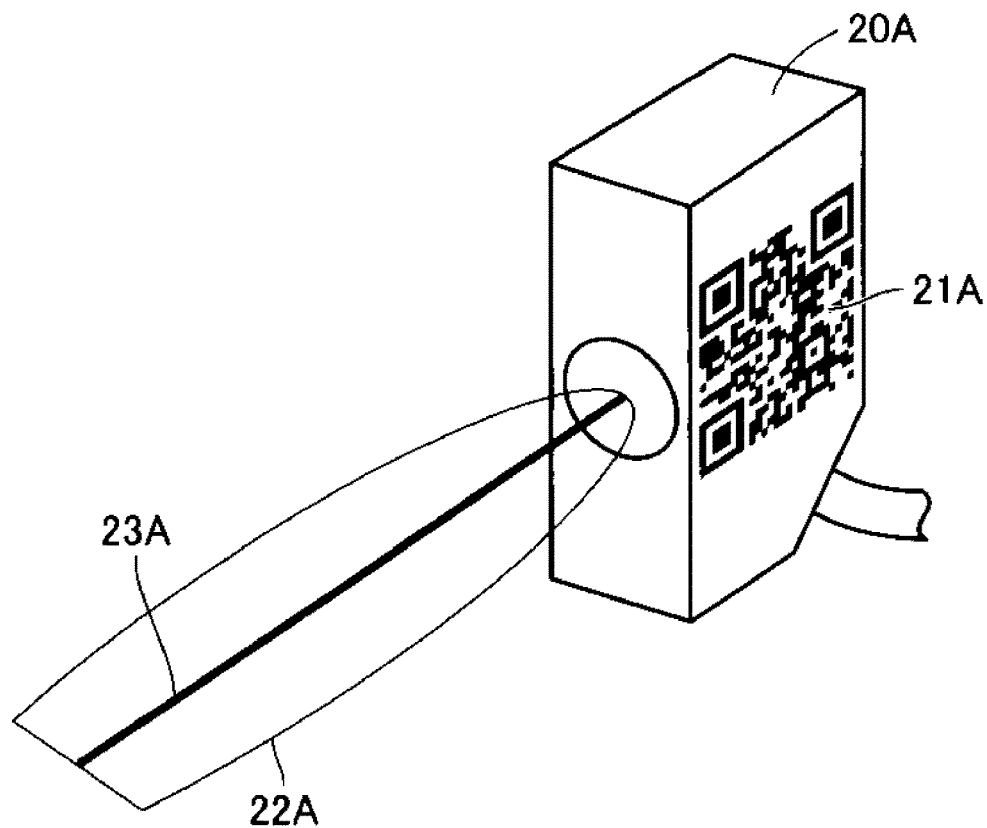
FIG. 7 is a schematic diagram illustrating a schematic configuration of a first modified example of a sensor in an embodiment.

The case that the sensor is an ultrasonic sensor will be specifically described. FIG. 7 is a schematic diagram showing a schematic configuration of a first modified example of the sensor in an embodiment. A sensor 20A is an ultrasonic sensor and detects the presence or absence of an object or the distance to the object by transmitting ultrasonic waves towards the object by a transmitter and receiving the reflected waves by a receiver. To detect an object correctly by an ultrasonic sensor, the object needs to be in the detection direction and within the detection area. The detection direction of the ultrasonic sensor is the direction in which the ultrasonic waves transmitted from the transmitter propagate, and the detection area is a surrounding area of the ultrasonic waves. However, it is not easy to check whether the propagation direction of the ultrasonic waves transmitted from the ultrasonic sensor is directed to the object or to check how the detection area is positioned. To address this issue, the terminal device 10 acquires the form information of the sensor 20A from the two-dimensional code 21A and displays as shown in FIG. 7 the image of the sensor 20A on which are superimposed the virtual image 23A of the center line, of the detection area, indicating the propagation direction of the ultrasonic waves and the virtual image 22A representing the detection area, so that the center line of the detection area and the detection area of the sensor 20A can be visualized.

Figure 8:
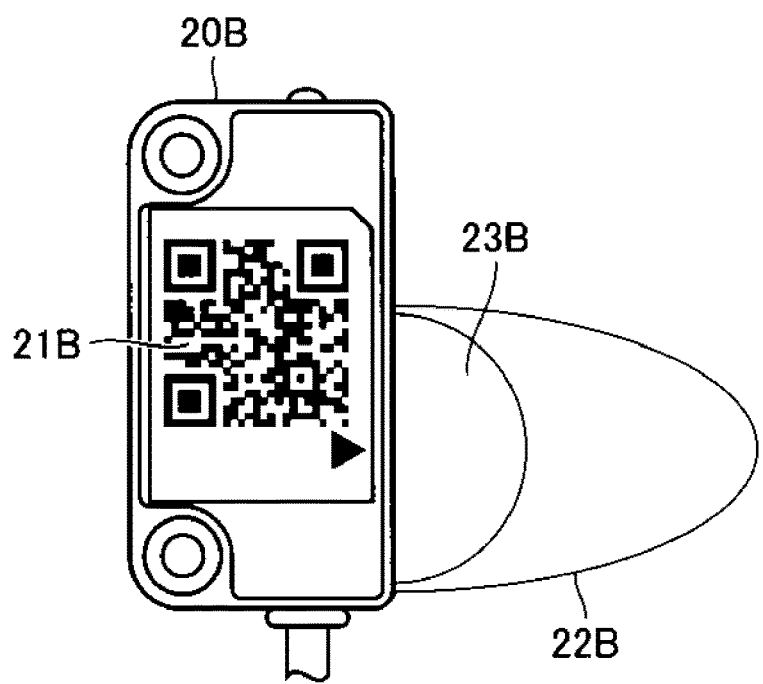
FIG. 8 is a schematic diagram illustrating a schematic configuration of a second modified example of a sensor in an embodiment.

Next, the case that the sensor is a non-contact door switch will be specifically described. FIG. 8 is a schematic diagram showing a schematic configuration of a second modified example of the sensor in an embodiment. A sensor 20B is a non-contact door switch and has different detection areas, one of which is for detecting the transition from an ON state to an OFF state and the other of which is for detecting the transition from an OFF state to an ON state; and the switching between an ON state and an OFF state has hysteresis. However, with respect to the non-contact door switch, it is not easy to check how much difference there is between the detection area for detecting the transition from an ON state to an OFF state and the detection area for detecting the transition from an OFF state to an ON state. To address this issue, the terminal device 10 acquires the form information of the sensor 20B from the two-dimensional code 21B and displays as shown in FIG. 8 the image of the sensor 20B on which the virtual image 22B representing the detection area for detecting the transition from an ON state to an OFF state of the sensor 20B and the virtual image 23B representing the detection area for detecting the transition from an OFF state to an ON state are superimposed, so that the difference between the detection areas of the sensor 20B can be visualized.

Figure 9:
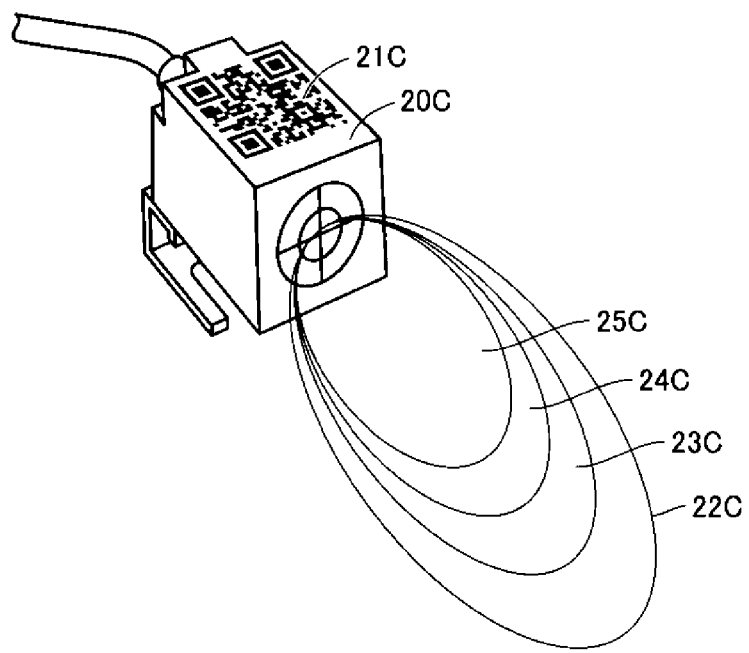
FIG. 9 is a schematic diagram illustrating a schematic configuration of a third modified example of a sensor in an embodiment.

Next, the case that the sensor is a proximity switch will be specifically described. FIG. 9 is a schematic diagram showing a schematic configuration of a third modified example of the sensor in an embodiment. A sensor 20C is a proximity switch and has different detection areas depending on the types of objects. However, with respect to the proximity switch, it is not easy to check which type of object has what size of a detection area. To address this issue, the terminal device 10 acquires the form information of the sensor 20C from the two-dimensional code 21C and displays as shown in FIG. 9 the image of the sensor 20C on which, for example, a virtual image 22C representing the detection area capable of detecting aluminum, a virtual image 23C representing the detection area capable of detecting brass, a virtual image 24C representing the detection area capable of detecting stainless steel, a virtual image 25C representing the detection area capable of detecting iron are superimposed, so that the difference among the detection areas, of the sensor 20C, for respective types of objects can be visualized.

Figure 10:
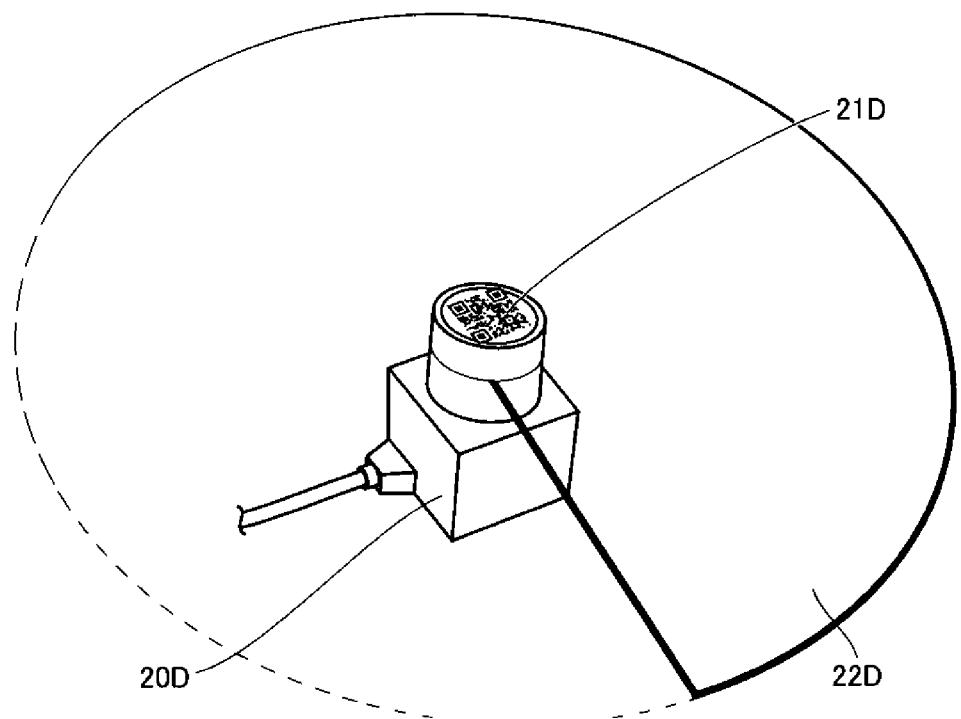
FIG. 10 is a schematic diagram illustrating a schematic configuration of a fourth modified example of a sensor in an embodiment.

Next, the case that the sensor is an area sensor will be specifically described. FIG. 10 is a schematic diagram showing a schematic configuration of a fourth modified example of the sensor in an embodiment. A sensor 20D is an area sensor, and the detection area is not fixed but temporally changes. However, with respect to the area sensor, it is not easy to check how the detection area is changing. To address this issue, the terminal device 10 acquires the form information of the sensor 20D from the two-dimensional code 21D, and at the same time, a synchronization signal is transmitted from the sensor 20D to the terminal device 10 so that the timings of the screen display of a detection area 22D of the sensor 20D and the screen display of the terminal device 10 are in synchronism to each other. Thus, the image of the sensor 20D on which the temporally changing detection area of the sensor 20D is superimposed is displayed as shown in FIG. 10, so that the change of detection area 22D of the sensor 20D can be visualized.

H. Modified Examples (1) In the sensor support system 1 according to an embodiment, the two-dimensional code 21 may include all of the form information of the sensor 20, the storage 160 of the terminal device 10 may include the form information of the sensor 20, or a storage of an external device may include the form information of the sensor 20. Alternatively, in the sensor support system 1 according to an embodiment, part of the form information of the sensor 20 may be included in each of the two-dimensional code 21, the storage 160 of the terminal device 10, and a storage of an external device. Further, the above description describes that in the sensor support system 1 according to an embodiment, the form information of the sensor 20 is stored in the storage of the PLC as an external device; however, other than the PLC, the form information of the sensor 20 may be stored in a PC or a data base which is communicable with the terminal device 10.

(2) The above description describes that the position calculator 154 according to an embodiment compares the shape information of the two-dimensional code and the image of the two-dimensional code taken by the imaging unit 151 with each other to calculate the position information of the sensor 20. However, the present invention is not limited to the above configuration, and the position calculator 154 may calculate the position information of the sensor 20 by comparing the shape information of the sensor 20 itself and the image of the sensor 20 taken by the imaging unit 151 with each other.

(3) The above description describes that the storage tag attached on the sensor 20 according to an embodiment is a two-dimensional code. However, the storage tag is not limited to a two-dimensional code, and the storage tag may be a bar code, an identification number, or the like and may be a magnetic tape or an IC chip. However, if a magnetic tape or an IC chip is employed as the storage tag, it is necessary to provide on the reading unit 152, in addition to the imaging unit 151, a separate reading device which can read information from the storage tag.

(4) The above description describes that in the sensor support system 1 according to an embodiment, the display unit 158 of the terminal device 10 displays thereon the synthetic image on which the virtual image of the form information of the sensor 20 is superimposed. However, the present invention is not limited to the above configuration, and the synthetic image on which the virtual image of the form information of the sensor 20 is superimposed may be displayed on a smartphone or a head mounted display.

(5) The sensor according to an embodiment may be a moving object such as a robot arm having a certain movable range, and the configuration may be made such that the object having a two-dimensional code attached thereon is imaged by the terminal device 10 so that the virtual image of the movable range of the object is generated from the information of the two-dimensional code, and the virtual image is displayed on the display unit 158 of the terminal device 10, being superimposed on the image of the object.

It should be understood that an embodiment disclosed herein is an example in all respects and is not restrictive. The scope of the present invention is not defined by the above description but defined by the claims, and it is intended that the scope of the present invention includes all variations within the meaning and the scope equivalent to the claims.

The invention claimed is:

1. A sensor support system comprising:
   a sensor; and
   a terminal comprising a processor configured with a program to perform operations to display form information of the sensor, wherein
   the sensor comprises
      a storage tag readable from the terminal and configured to store the form information of the sensor,
   the terminal comprises:

a camera configured to take an image of the sensor;
the processor configured with the program to perform operations comprising:
  operation as a reading unit configured to read information from the storage tag of the sensor;
  operation as a position calculator configured to calculate position information of the sensor from the image of the sensor taken by the camera,
  operation as an image generator configured to generate a virtual image of a detection direction and a detection area of the sensor included in the form information, based on the position information calculated by the position calculator; and
  operation as a synthesizing unit configured to superimpose the virtual image on the image of the sensor taken by the camera to synthesize a synthetic image; and
a display configured to display the synthetic image synthesized by the synthesizing unit.

2. The sensor support system according to claim 1, wherein the form information further comprises shape information of the storage tag, and
the processor is configured with the program to perform operations such that operation as the position calculator comprises operation as the position calculator that calculates the position information of the sensor by comparing the shape information of the storage tag read by the reading unit with the image of the storage tag taken by the camera.

3. The sensor support system according to claim 1, wherein the processor is configured with the program to perform operations such that operation as the reading unit comprises operation as the reading unit that reads out relevant information related to the read information of the storage tag, from a storage of the terminal or from an external storage.

4. The sensor support system according to claim 1, wherein the storage tag comprises a two-dimensional code.

5. A terminal for displaying form information of a sensor, wherein the sensor comprises a storage tag readable from the terminal and configured to store the form information of the sensor, the terminal comprising:
a camera configured to take an image of the sensor;
a processor configured with a program to perform operations comprising:
  operation as a reading unit configured to read information from the storage tag of the sensor;
  operation as a position calculator configured to calculate position information of the sensor from the image of the sensor taken by the camera,
  operation as an image generator configured to generate a virtual image of a detection direction and a detection area of the sensor included in the form information, based on the position information calculated by the position calculator; and
  operation as a synthesizing unit configured to superimpose the virtual image on the image of the sensor taken by the camera to synthesize a synthetic image; and
a display configured to display the synthetic image synthesized by the synthesizing unit.

6. A sensor which causes a terminal to display form information, wherein
the terminal comprises:
a camera configured to take an image of the sensor;
a processor configured with a program to perform operations comprising:
  operation as a reading unit configured to read information from a storage tag of the sensor;
  operation as a position calculator configured to calculate position information of the sensor from the image of the sensor taken by the camera,
  operation as an image generator configured to generate a virtual image of a detection direction and a detection area of the sensor included in the form information, based on the position information calculated by the position calculator; and
  operation as a synthesizing unit configured to superimpose the virtual image on the image of the sensor taken by the camera to synthesize a synthetic image; and
a display configured to display the synthetic image synthesized by the synthesizing unit, and
the sensor comprises:
  the storage tag readable from the terminal and configured to store the form information of the sensor.

7. A method for supporting a sensor, in which method form information of the sensor is displayed on a terminal, the method comprising:
taking an image of the sensor including a storage tag readable from the terminal and configured to store the form information of the sensor;
reading information from the storage tag of the sensor;
calculating position information of the sensor from the taken image of the sensor;
generating a virtual image of a direction and a detection area of the sensor included in the form information, based on the calculated position information;
superimposing the virtual image on the taken image of the sensor to synthesize a synthetic image; and
displaying the synthetic image.

8. The sensor support system according to claim 2, wherein the processor is configured with the program to perform operations such that operation as the reading unit comprises operation as the reading unit that reads out relevant information related to the read information of the storage tag, from a storage of the terminal or from an external storage.

9. The sensor support system according to claim 2, wherein the storage tag comprises a two-dimensional code.

10. The sensor support system according to claim 3, wherein the storage tag comprises a two-dimensional code.

11. The sensor support system according to claim 8, wherein the storage tag comprises a two-dimensional code.

* * * * *